Aug. 28, 1934.  C. H. WILLIS  1,971,840
ELECTRIC POWER TRANSLATING SYSTEM
Filed Dec. 28, 1933
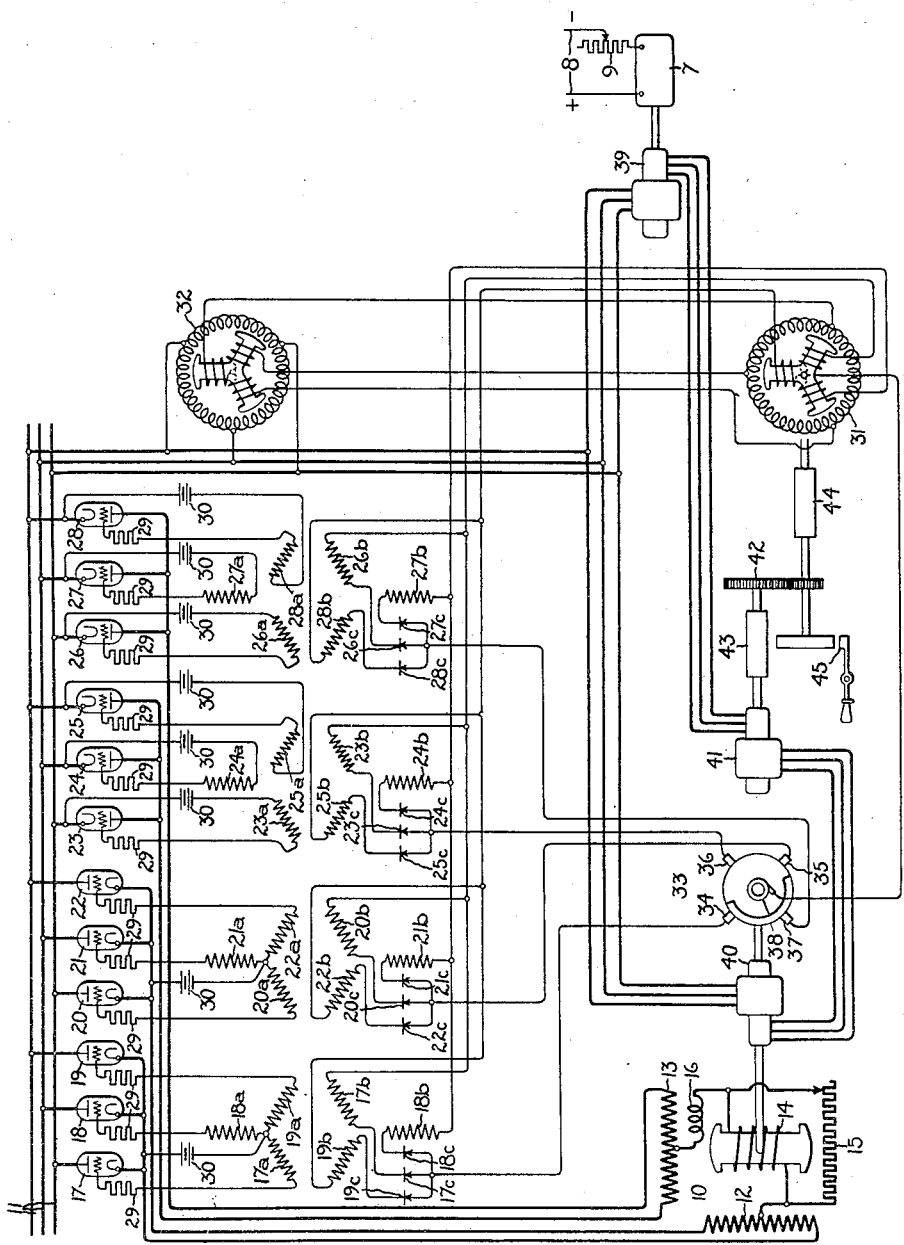
Inventor:
Clodius H. Willis,
by Harry E. Dunham
His Attorney.

Patented Aug. 28, 1934

1,971,840

UNITED STATES PATENT OFFICE 1,971,840

ELECTRIC POWER TRANSLATING SYSTEM

Clodius H. Willis, Princeton, N. J., assignor to General Electric Company, a corporation of New York Application December 28, 1933, Serial No. 704,291

9 Claims. (Cl. 172—293)

My invention relates to electric power translating systems, and more particularly to such systems for operating an electric motor in synchronism with a master rotating device.

In many industrial applications it is desirable to maintain a fixed speed and phase relation between a master rotating device, which may be either a pilot motor or a power motor, and one or more secondary electric motors. My invention relates to a new and improved electric power translating system capable of securing these results.

It is an object of my invention, therefore, to provide an electric power translating system including a master rotating device and a secondary electric motor in which a predetermined speed relation will be maintained between the rotating device and the motor.

It is another object of my invention to provide an improved electric power translating system including a master rotating device and a secondary electric motor, by means of which a predetermined phase relation will be maintained between the rotating device and the electric motor.

It is a further object of my invention to provide an improved electric power translating system including a master rotating device and a secondary electric motor, by means of which both a predetermined relation between the speed and the angular position of the master rotating device and the motor will be maintained under all operating conditions.

In accordance with one embodiment of my invention, a secondary electric motor whose speed and phase angle is to be controlled is of the electric valve commutated type. The conductivity of the electric valves from which the secondary motor is operated is controlled by a distributor mechanism driven by the secondary motor. The master rotating device may be any rotating device, such as a pilot motor or a power motor. In order to maintain a predetermined speed relation and a predetermined angular phase relation between the master rotating device and the motor, there is provided a differential mechanism which may be either a mechanical differential mechanism or an electrical differential mechanism. By way of example, I have illustrated an electrical differential mechanism comprising electric motion transmitting elements driven by the master rotating device and by the motor, and a differential electric motion receiving element interconnecting the transmitting elements. The differential receiving element is connected to operate a rotary phase shifting transformer or other control device included in the control circuits of the several electric valves for introducing a corrective effect in the control circuits to compensate for any angular phase displacement between the master rotating device and the motor. In order to prevent hunting of the system, due to inertia of any of the moving parts, an elastic coupling is interposed in the connections between the differential motion receiving mechanism and the rotary phase shifting device and one of the elements of this coupling is critically damped by means of a brake or other suitable damping means. With this provision, the modifying effect responsive to an angular displacement between the master rotating device and the electric motor is retarded by the elastic coupling and the damping means, which latter means is also effective to prevent over-running of the rotary phase shifting element.

For a better understanding of my invention, together with other and further objects thereof, reference is had to the following description taken in connection with the accompanying drawing, and its scope will be pointed out in the appended claims. The single figure of the drawing is a diagrammatic representation of my invention as applied to a system for operating a quarter phase alternating current motor from a three phase alternating current supply circuit and maintaining a predetermined speed and phase relation between the motor and a master rotating device.

Referring now more particularly to the drawing, there is illustrated an arrangement for operating a quarter phase motor 10 from a three phase alternating current supply circuit 11 and maintaining a predetermined speed and phase relation between the motor 10 and a master rotating device, such as a pilot motor 7 energized from a suitable source of current 8 through a speed adjusting resistor 9. The motor 10 may be any of the several types well known in the art, although I have illustrated by way of example an electric valve commutated motor of the synchronous type comprising the phase windings 12 and 13 and a rotatable field winding 14. The field winding 14 may be connected in series with the armature winding, as illustrated, in case it is desired to give the motor series characteristics, or in case shunt characteristics are desired, the field winding may be separately excited in any well known manner. As illustrated, the field winding 14 is connected between the electrical neutrals of the phase windings 12 and 13, a circuit which carries unidirectional current, as will be explained more fully hereinafter. A variable resistor 15 may be connected across the field winding 14 to regulate the excitation characteristics of the motor, in which case it is preferable also to include a reactor 16 in series with the parallel connected winding 14 and resistor 15. The terminals of the armature phase winding 12 are connected to the several phases of the supply circuit 11 through two groups of similarly connected electric valves 17—18—19 and 20—21—22, respectively. Similarly, the armature phase winding 13 is connected to the supply circuit 11 through two groups of electric valves 23—24—25 and 26—27—28 connected to the circuit 11 with a polarity opposite to that of the electric valves 17—22, inc. Each of the electric valves 17-28, inc., is provided with an anode, a cathode and a control electrode or grid, and may be of any of the several types well known in the art, although I prefer to use valves of the vapor or gaseous electric discharge type.

The grid, or control element, of each of the valves is connected to its respective cathode through a current limiting resistor 29 and a negative bias battery 30, and one of the secondary windings 17a—28a of a plurality of grid transformers. The primary windings 17b—28b of the grid transformers are connected to be energized from the alternating current circuit 11 through a suitable phase shifting means, such as a rotary phase shifting transformer 31, controlled in response to the regulating apparatus described hereinafter, and a second rotary phase shifting transformer 32, which may be adjusted manually to control the speed-torque characteristics of the motor 10. It will be noted that the primary and secondary windings of a grid transformer associated with a particular valve are designated by the number of that valve with the subscripts "a" and "b", respectively. The primary windings of the grid transformers associated with the groups of electric valves 17—18—19, 20—21—22, etc., are connected in star, and interposed in the connections between each primary winding and electrical neutral of its group is one of the unilaterally conductive devices 17c—28c.

In order selectively to render conductive the several groups of electric valves 17—18—19, 20—21—22, etc., there is provided a distributor mechanism 33 driven directly by the motor 10 and having four equally spaced brushes 34, 35, 36 and 37 and a single contact segment 38 extending for substantially 180 electrical degrees. The contact segment 38 is connected through a suitable slip ring to the electrical neutral of the secondary winding of the phase shifting transformer 31, while the several brushes 34-37, inc., are connected to the electrical neutrals of the groups of primary windings of the grid transformers, so that the neutral connection of each of the groups of primary windings 17b—18b—19b, 20b—21b—22b, etc., includes a single brush and segment element of the mechanism 33.

In order to compensate for any angular phase displacement between the master rotating device 7 and the motor 10, the electric motion transmitting elements 39 and 40 are driven from the device 7 and the motor 10, respectively, while a differential electric motion receiving element 41 interconnects the secondary windings of the transmitting elements 39 and 40. The elements 39, 40 and 41 are structurally similar and may be of any of the several types well known in the art, the best known examples of which comprise polyphase wound-rotor and stator windings. In the use of this type of device the stator or primary windings of the devices 39 and 40 are energized directly from the alternating current circuit 11, while their secondary windings are connected to the rotor and stator, respectively, of the receiving element 41. The rotary member of the receiving element 41 is connected to drive the rotary element of the phase shifting transformer 31 through a ratio adjusting gear mechanism 42. Elastic couplings 43 and 44 are preferably included between the element 41 and the gearing 42 and between the gearing 42 and the rotary element of the phase shifting transformer 31, respectively, these elastic couplings comprising, for example, sections of rubber hose. A friction brake 45, or other damping mechanism, is preferably connected to that element of the gearing 42 which, in turn, is connected to the rotary element of the phase shifting transformer 31.

The general principles of operation of the above described apparatus for transmitting energy from the alternating current circuit 11 to the motor 10 will be well understood by those skilled in the art. In giving a brief explanation of this operation, it will be assumed that the motor field member 14 and the distributor mechanism 33 are in substantially the positions illustrated, and that the rotary phase shifting transformers 31 and 32 are so adjusted that the potentials impressed upon the grids of the several electric valves through their associated transformers are substantially in phase with the anode potentials of these valves.

Under these conditions, it will be seen that the electrical neutral connections of the groups of primary windings 17b—18b—19b and 26b—27b—28b are completed through the brushes 34 and 37, respectively, of the distributor mechanism 33, while the electrical neutrals of the primary networks of the other grid transformers are open circuited so that these grid transformers are deenergized. Thus, the grid transformers 17a—19b and 26a—28b are energized to excite the groups of valves 17—18—19 and 26—27—28, respectively. The unilaterally conductive devices 17c-28c, inc., are included in the neutrals of the primary windings of the grid transformers to simplify the grid circuits by permitting the use of a single distributor disk for controlling the potentials of all the phases of the supply circuits. The two groups of valves 17—18—19 and 26—27—28 comprise a three phase full wave rectifier circuit of which the unidirectional current circuit comprises the lower half of the armature winding 12, the field winding 14, reactor 16 and the right-hand portion of the armature winding 13.

The resultant motor field created by current flowing in the armature windings 12 and 13 will be in such a direction as to exert a torque upon the motor field 14 and initiate rotation of the motor. When the distributor mechanism 33 has been rotated through approximately 90 electrical degrees by the motor 10, the neutral connection of the transformer windings 26b—27b—28b will be opened at the brush 37, while the neutral connection of the transformer windings 23b—24b—25b will be completed at the brush 36. Electric valves 26—27—28 will now become non-conductive, while electric valves 23—24—25 are rendered conductive to transfer the current from the right-hand portion of the armature winding 13 to the left-hand portion. The armature magnetomotive force of the motor 10 is thus advanced 90 electrical degrees and a torque is produced on the motor field 14 to rotate it through an additional 90 degrees. In this manner, current is successively commutated between the several terminals of the armature windings 12 and 13 to produce a rotating armature magnetomotive force and a rotation of the motor 10.

As is well understood by those skilled in the art, the average voltage impressed upon the armature windings 12 and 13 may be reduced under starting conditions by retarding the phase of the potentials applied to the grid transformer windings 17b-28b, inc., by means of the rotary phase shifting transformer 32. By gradually advancing the phase of the grid potentials by the phase shifting transformers 32 the average voltage impressed upon the motor 10 may be increased with increase in speed of the motor. With the above described arrangement alone, the motor 10 is essentially a synchronous alternating current motor upon which is impressed an alternating current of a frequency variable in accordance with the load on the motor. In brief, the motor 10 has substantially the speed torque characteristics of a direct current series motor.

In case it is desired to maintain a predetermined phase relation between the master motor 7 and the motor 10, additional apparatus must be provided to compensate for this variation in speed with variation in load. In the apparatus described above this function is accomplished by means of the electric motion transmitting elements 39 and 40 driven by the motors 7 and 10, respectively, and the differential electric motion receiving element 41. Corresponding windings, such as the stator windings, of the elements 39 and 40 are energized from the alternating current circuit 11, while the secondary windings are connected to the rotor and stator windings of the motion receiving element 41, as illustrated. With such an arrangement, the rotor of the element 41 moves through an angle with respect to its stator corresponding to the angular phase displacement between the rotary members of the elements 39 and 40. This angular displacement is transmitted through a suitable ratio adjusting gear mechanism 42 to the rotary member of the phase shifting transformer 31, thus varying the phase of the grid potentials impressed upon the electric valves 17-28, inc., to vary the voltage impressed upon the armature windings 12 and 13 of the motor 10 and to bring the rotor of the motor 10 back into phase coincidence with the rotor of the motor 7.

In order to prevent effect of over-running of the rotary member of the phase shifting transformer 31 resilient couplings 43 and 44 are interposed in the driving connection from the motion receiving element 41 to the rotary member of the phase shifting transformer 31 on each side of the gear mechanism 42. The gear mechanism 42 is also damped by a friction brake 45, or any other suitable damping means. The effect of this resilient coupling and damping means is to retard the application of the corrective voltage to the armature of the motor 10 with respect to the occurrence of a phase displacement between the motor 7 and the motor 10 and at the same time to prevent over-running of the rotary member of the phase shifting transformer 31.

While I have illustrated my invention as applied to a system for transmitting energy from a three phase alternating current supply system 11 to a valve commutated quarter phase motor 10, it will be obvious to those skilled in the art that it is equally suitable for the transmission of energy between supply circuits of any type and a motor of any type or any number of phases. Furthermore, it will be apparent that the motor 7 may be a power motor rather than a pilot motor, as illustrated, or that any number of motors may be maintained in synchronism and phase coincidence with the motor 7 by merely duplicating the apparatus for controlling and operating the motor 10.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In an electric power translating system, a master rotating device, a source of current, a secondary electric motor, a plurality of electric valves connected to transmit energy from said source to said motor, means driven by said motor for controlling the conductivity of said valves to determine the speed of said motor, and differential means responsive jointly to the rotation of said master device and of said motor for modifying the action of said conductivity controlling means in accordance with the angular displacement between said master device and said motor.

2. In an electric power translating system, a master motor, a secondary electric motor, a source of current, a plurality of controlled electric valves interconnecting said source and the several terminals of said secondary motor, a distributor mechanism driven by said secondary motor for controlling the excitation of the control elements of said valves to determine the speed of said secondary motor, and differential means responsive jointly to the rotation of said master motor and said secondary motor for modifying the action of said distributor mechanism in accordance with the angular displacement between said master motor and said secondary motor.

3. In an electric power translating system, a master motor, a secondary electric motor, a source of current, a plurality of electric valves interconnecting said source and the several terminals of said secondary motor, each of said valves being provided with a control electrode, circuits for exciting said control electrodes from said source, a distributor mechanism interposed in said control circuits for effecting their energization in a predetermined sequence to determine the speed of said secondary motor, said distributor being driven by said secondary motor, and differential means responsive jointly to the rotation of said master motor and said secondary motor for modifying the excitation of said control electrodes.

4. In an electric power translating system, a master motor, a secondary electric motor, a source of alternating current, a plurality of electric valves interconnecting said source and the several terminals of said secondary motor, each of said valves being provided with a control electrode, circuits for exciting said control electrodes with alternating potentials derived from said source, a distributor mechanism interposed in said control circuits for effecting their energization in a predetermined sequence to determine the speed of said secondary motor, said distributor being driven by said secondary motor, and differential means responsive jointly to the rotation of said master motor and said secondary motor for varying the phase of the alternating control potentials.

5. In an electric power translating system, a master rotating device, a source of current, a secondary electric motor, a plurality of electric valves connected to transmit energy from said source to said motor, means driven by said motor for controlling the conductivity of said valves to determine the speed of said motor, and means responsive to the angular phase displacement between said master device and said motor for modifying the action of said conductivity controlling means.

6. In an electric power translating system, a master rotating device, a source of current, a secondary electric motor, a plurality of electric valves connected to transmit energy from said source to said motor, means driven by said motor for controlling the conductivity of said valves to determine the speed of said motor, an electric motion transmitting element driven by said master device, an electric motion transmitting element driven by said motor, a differential electric motion receiving element interconnecting said transmitting elements, and means driven by said differential element for modifying the action of said conductivity controlling means.

7. In an electric power translating system, a master rotating device, a source of current, a secondary electric motor, a plurality of electric valves connected to transmit energy from said source to said motor, means driven by said motor for controlling the conductivity of said valves to determine the speed of said motor, differential means responsive jointly to the rotation of said master device and of said motor, means driven by said differential means for modifying the action of said conductivity controlling means, and means for further modifying the action of said conductivity controlling means to minimize the hunting of the system.

8. In an electric power translating system, a master rotating device, a source of current, a secondary electric motor, a plurality of electric valves connected to transmit energy from said source to said motor, means driven by said motor for controlling the conductivity of said valves to determine the speed of said motor, an electric motion transmitting element driven by said master device, an electric motion transmitting element driven by said motor, a differential electric motion receiving element interconnecting said transmitting elements, means driven by said differential element for modifying the action of said conductivity controlling means, and means interposed in the driving connection of said last mentioned means for minimizing the hunting of the system.

9. In an electric power translating system, a master rotating device, a secondary electric motor, a source of current, a plurality of electric valves connected to transmit energy from said source to said motor, means for controlling the conductivity of said valves to determine the speed of the motor including a rotary phase shifting device and a distributor driven by said motor, an electric motion transmitting element driven by said master device, an electric motion transmitting element driven by said motor, a differential electric motion receiving element interconnecting said transmitting elements, the rotary element of said phase shifting device being driven by said differential element, and an elastic coupling and a motion damping device interposed in the driving connection between said differential element and said rotary element.

CLODIUS H. WILLIS.